(12) United States Patent
Bennati et al.

(10) Patent No.: US 12,026,288 B2
(45) Date of Patent: Jul. 2, 2024

(54) METHOD, APPARATUS, AND COMPUTER PROGRAM PRODUCT FOR CONFIDENTIAL COMPUTING

(71) Applicant: HERE GLOBAL B.V., Eindhoven (NL)

(72) Inventors: Stefano Bennati, Zurich (CH); Tero Juhani Keski-Valkama, Zurich (CH)

(73) Assignee: HERE GLOBAL B.V., Eindhoven (NL)

( * ) Notice: Subject to any disclaimer, the term of this patent is extended or adjusted under 35 U.S.C. 154(b) by 442 days.

(21) Appl. No.: 17/304,913

(22) Filed: Jun. 28, 2021

(65) Prior Publication Data

US 2022/0414267 A1   Dec. 29, 2022

(51) Int. Cl.
  G06F 21/71 (2013.01)
  G06F 21/62 (2013.01)
  (Continued)

(52) U.S. Cl.
  CPC .............. G06F 21/71 (2013.01); G06F 21/62 (2013.01); H04L 9/0819 (2013.01); H04L 9/3236 (2013.01); *G06F 2221/2149* (2013.01)

(58) Field of Classification Search
  CPC ........ G06F 21/71; G06F 21/53; G06F 21/602; G06F 21/6218; G06F 21/57; G06F 9/45558; G06F 2009/45587; G06F 16/1824; G06F 16/1834; G06F 21/62; H04L 9/50; H04L 9/3247; H04L 9/3239; H04L 67/10; H04L 67/104; H04L 9/0825; H04L 67/12;
  (Continued)

(56) References Cited

U.S. PATENT DOCUMENTS 9,703,981 B1 *  7/2017  Marion ................. H04W 12/06
9,792,427 B2 * 10/2017  Costa ..................... G06F 21/445
(Continued)

OTHER PUBLICATIONS

"DIA Leverages IBM Cloud and Confidential Computing to Help Secure its Decentralized Financial Information Platform", [online] [Retrieved Apr. 9, 2021] Retrieved from the Internet: <URL:https://newsroom.ibm.com/2021-01-26-DIA-Leverages-IBM-Cloud-and-Confidential-Computing-to-Help-Secure-its-Decentralized-Financial-Information-Platform>, (Jan. 26, 2021), 3 pages.
(Continued)

*Primary Examiner* — Sharif E Ullah
(74) *Attorney, Agent, or Firm* — ALSTON & BIRD LLP

(57) ABSTRACT

A method, apparatus, and computer program product are provided for using confidential computing to execute code on sensitive data in an encrypted area of an apparatus limiting access to data and code to only their respective owners. Methods may include: generating an outer enclave and at least one inner enclave within the outer enclave; providing an outer enclave key and an inner enclave key to a service provider; providing an inner enclave key to a data provider; receiving, from the data provider, a data retrieval location; processing data from the respective retrieval location at the data provider inner enclave using data provider code to generate data provider processed data; providing the data provider processed data to the service provider inner enclave; and processing the data provider processed data with service provider code to generate resultant data; decrypting the resultant data in the outer enclave.

20 Claims, 11 Drawing Sheets

(51) Int. Cl.
   *H04L 9/08*     (2006.01)
   *H04L 9/32*     (2006.01)

(58) Field of Classification Search
   CPC ............ H04L 63/123; H04L 2209/127; H04L 63/0428; H04L 9/0643; H04W 4/40; H04W 4/70; H04W 4/08; H04W 12/69; H04W 12/106; H04W 84/18; H04W 84/22; H04W 24/08; H04W 12/069; H04W 12/33
   USPC ........ 713/189, 150, 163, 181; 726/2, 21, 36; 380/255, 264, 276
   See application file for complete search history.

(56) References Cited

U.S. PATENT DOCUMENTS

| | | | | |
|---|---|---|---|---|
| 9,832,171 | B1* | 11/2017 | Roth .................... | H04L 9/0822 |
| 10,528,721 | B2* | 1/2020 | Sood .................... | G06F 9/45558 |
| 2003/0177819 | A1* | 9/2003 | Maale ................... | A61L 2/28 |
| | | | | 73/105 |
| 2007/0245414 | A1* | 10/2007 | Chan .................... | H04L 9/3234 |
| | | | | 726/12 |
| 2010/0124563 | A1* | 5/2010 | Coleman ................ | A61L 27/56 |
| | | | | 435/307.1 |
| 2010/0211799 | A1* | 8/2010 | Gladstone ............. | H04L 9/0894 |
| | | | | 713/189 |
| 2010/0242552 | A1* | 9/2010 | Sayegh ................ | E05B 73/0041 |
| | | | | 70/58 |
| 2011/0276490 | A1* | 11/2011 | Wang ................... | H04L 9/3236 |
| | | | | 705/317 |
| 2012/0026877 | A1* | 2/2012 | Rajappan ............... | H04L 65/752 |
| | | | | 370/235 |
| 2012/0244850 | A1* | 9/2012 | Doherty ................ | H04L 61/4557 |
| | | | | 455/418 |
| 2013/0054966 | A1* | 2/2013 | Clay ................... | H04L 63/0869 |
| | | | | 713/168 |
| 2014/0270179 | A1* | 9/2014 | Shen ................... | H04L 9/0897 |
| | | | | 380/282 |
| 2015/0089502 | A1* | 3/2015 | Horovitz ............... | G06F 9/45558 |
| | | | | 718/1 |
| 2015/0298191 | A1* | 10/2015 | Da Silva Alves .... | B30B 15/041 |
| | | | | 72/389.3 |
| 2017/0250972 | A1* | 8/2017 | Ronda .................. | H04L 9/0891 |
| 2019/0384923 | A1* | 12/2019 | Leitao ................... | G06F 21/606 |
| 2020/0134230 | A1* | 4/2020 | Booth, Jr. ............. | G06F 21/6245 |
| 2020/0233953 | A1* | 7/2020 | Palsson ................ | G06F 21/105 |
| 2021/0021580 | A1* | 1/2021 | McCallum ........... | H04L 63/0209 |
| 2021/0124823 | A1* | 4/2021 | Lidzborski ............ | G06F 21/53 |
| 2023/0280178 | A1* | 9/2023 | Keski-Valkama ..................... B60W 60/001 |
| | | | | 701/400 |

OTHER PUBLICATIONS

GitHub—veracruz-project / veracruz: What are Veracruz Computations? [online] [Retrieved Sep. 9, 2021] Retrieved from the Internet: <URL:https://github.com/veracruz-project/veracruz/wiki/What-are-Veracruz-computations%3F>, (Nov. 9, 2020), 8 pages.

Liu et al., "Confidential Attestation: Efficient in-Enclave Verification of Privacy Policy Compliance", ArXiv abs/2007.10513, (Jul. 20, 2020), 16 pages.

Park et al. "Nested Enclave: Supporting Fine-Grained Hierarchical Isolation with SGX." 2020 ACM/IEEE 47th Annual International Symposium on Computer Architecture (ISCA), (May 30-Jun. 3, 2020), 14 pages.

\* cited by examiner

METHOD, APPARATUS, AND COMPUTER PROGRAM PRODUCT FOR CONFIDENTIAL COMPUTING

TECHNOLOGICAL FIELD

An example embodiment of the present disclosure relates to maintaining data privacy while processing sensitive data, and more particularly, to using confidential computing to execute code on sensitive data in an encrypted area of an apparatus prohibiting access to the sensitive data and the executed code by anyone other than their respective owners.

BACKGROUND

Service providers and device manufacturers (e.g., wireless, cellular, navigation, etc.) are continually challenged to deliver value and convenience to consumers by providing compelling and useful services. Location-based services have been developed to provide users with useful and relevant information regarding route planning and to facilitate route guidance along the way. Substantially static data regarding roadways is used in conjunction with dynamic data, such as traffic, construction, and incident information to provide accurate and timely information to a driver to help route planning and decision making.

Data received from infrastructure monitoring systems and crowd-sourced data has become ubiquitous and may be available for facilitating route guidance and navigation system information. However, this data can be mined to provide various other services to users and to grow the availability of location-based services. The provision of location-based services is dependent upon understanding the location of a user requesting the services. Maintaining anonymity while also being able to access location-based services is a challenge.

BRIEF SUMMARY

A method, apparatus, and computer program product are provided in accordance with an example embodiment described herein for maintaining data privacy while processing sensitive data, and more particularly, to using confidential computing to execute code on sensitive data in an encrypted area of an apparatus prohibiting access to the sensitive data and the executed code by anyone other than their respective owners. According to an example embodiment, an apparatus is provided including at least one processor and at least one memory including computer program code, the at least one memory and computer program code configured to, with the processor, cause the apparatus to at least: generate an outer enclave of at least one of the at least one processor and the at least one memory, and at least one inner enclave within the outer enclave; provide an outer enclave key of the outer enclave and an inner enclave key of a service provider inner enclave to a service provider; provide an inner enclave key of a data provider inner enclave to a data provider of at least one data providers; receive, from the data provider, a data retrieval location; process data from the respective retrieval location at the data provider inner enclave using data provider code to generate data provider processed data; provide the data provider processed data to the service provider inner enclave; process the data provider processed data with service provider code to generate resultant data; decrypt the resultant data in the outer enclave using the outer enclave key; and provide the decrypted resultant data for provision of at least one service by the service provider.

According to some embodiments, the received data retrieval location includes at least one of a pointer to a region of shared memory or an identifier of a database. Causing the apparatus to receive, from the data provider, a data retrieval location optionally includes causing the apparatus to receive, from the data provider, a batch size of data to be retrieved from the data retrieval location. Causing the apparatus to receive, from the data provider, a data retrieval location optionally includes causing the apparatus to receive, from the data provider, a hash of information provided with the data retrieval location, where the hash of information provided with the data retrieval location is used to validate that data is retrieved properly from the data retrieval location.

According to some embodiments, the data from the data provider includes probe data including a series of location points and associated time stamps, where the service provider includes a location-based service provider, and the at least one service provider includes a location-based service. The apparatus of some embodiments is caused to: determine validity of the resultant data using a validation function; and provide the decrypted resultant data for provision of at least one service by the service provider in response to a positive determination of validity. The validity function of some embodiments includes a hash function to confirm absence of malicious code in the service provider code and the data provider code.

Embodiments provided herein include a computer program product having at least one non-transitory computer-readable storage medium having computer-executable program code portions stored therein, the computer-executable program code portions including program code instructions configured to: generate an outer enclave of at least one of at least one processor and the at least one non-transitory memory, and at least one inner enclave within the outer enclave; provide a service provider inner enclave key for each of the at least one inner enclave to a service provider; receive, within each inner enclave, service provider code; provide a data provider inner enclave key for the at least one inner enclave to a respective data provider; receive, within the at least one inner enclave, data from the respective data provider; process, within the at least one inner enclave, the data from the respective data provider using service provider code to generate processed data; provide the processed data to the outer enclave; and decrypt the processed data from the outer enclave to provide at least one service from the service provider based on the data from the at least one data provider.

According to some embodiments, the received data retrieval location includes at least one of a pointer to a region of shared memory or an identifier of a database. The program code instructions to receive, from the data provider, a data retrieval location may include program code instructions to receive, from the data provider, a batch size of data to be retrieved from the data retrieval location. The program code instructions to receive, from the data provider, a data retrieval location optionally includes program code instructions to receive, from the data provider, a hash of information provided with the data retrieval location, where the hash of information provided with the data retrieval location is used to validate that data is retrieved properly from the data retrieval location.

According to some embodiments, the data from the data provider includes probe data including a series of location points and associated time stamps, where the service provider includes a location-based service provider, and the at least one service includes a location-based service. Embodiments may include program code instructions to: determine validity of the resultant data using a validation function; and provide the decrypted resultant data for provision of at least one service by the service provider in response to a positive determination of validity. The validity function of some embodiments includes a hash function to confirm absences of malicious code in the service provider code and the data provider data.

Embodiments provided herein include a method including: generating an outer enclave of at least one of at least one processor and at least one memory, and at least one inner enclave within the outer enclave; providing a service provider enclave key of a service provider enclave to a service provider where the service provider enclave comprises at least one of the outer enclave and the at least one inner enclave; providing an inner enclave key of a data provider inner enclave to a data provider of at least one data provider; receiving, from the data provider, a data retrieval location; processing data from the respective retrieval location at the data provider inner enclave using data provider code to generate data provider processed data; providing the data provider processed data to the service provider inner enclave; processing the data provider processed data with service provider code to generate resultant data; decrypting the resultant data in the outer enclave using the outer enclave key; and providing the decrypted resultant data for provision of at least one service by the service provider.

The received data retrieval location, in some embodiments, includes at least one of a pointer to a region of shared memory or an identifier of a database. According to some embodiments, receiving, from the data provider, a data retrieval location includes receiving, from the data provider, a batch size of data to be retrieved from the retrieval location. According to some embodiments, receiving, from the data provider, a data retrieval location includes receiving, from the data provider, a hash of information provided with the data retrieval location, where the hash of information provided with the data retrieval location is used to validate that data is retrieved properly from the data retrieval location. The data from the data provider includes, in some embodiments, probe data including a series of location points and associated time stamps, where the service provider includes a location-based service provider and where the at least one service include a location based service. Methods optionally include: determining validity of the resultant data using a validity function; and providing the decrypted resultant data for provision of at least one service by the service provider in response to a positive determination of validity.

Embodiments provided herein include an apparatus including: means for generating an outer enclave of at least one of a processor and/or a memory, and at least one inner enclave within the outer enclave; means for providing an outer enclave key of the outer enclave and an inner enclave key of a service provider inner enclave to a service provider; means for providing an inner enclave key of a data provider inner enclave to a data provider of at least one data provider; means for receiving, from the data provider, a data retrieval location; means for processing data from the respective retrieval location at the data provider inner enclave using data provider code to generate data provider processed data; means for providing the data provider processed data to the service provider inner enclave; means for processing the data provider processed data with service provider code to generate resultant data; means for decrypting the resultant data in the outer enclave using the outer enclave key; and means for providing the decrypted resultant data for provision of at least one service by the service provider.

The received data retrieval location, in some embodiments, includes at least one of a pointer to a region of shared memory or an identifier of a database. According to some embodiments, the means for receiving, from the data provider, a data retrieval location includes means for receiving, from the data provider, a batch size of data to be retrieved from the retrieval location. According to some embodiments, the means for receiving, from the data provider, a data retrieval location includes means for receiving, from the data provider, a hash of information provided with the data retrieval location, where the hash of information provided with the data retrieval location is used to validate that data is retrieved properly from the data retrieval location. The data from the data provider includes, in some embodiments, probe data including a series of location points and associated time stamps, where the service provider includes a location-based service provider and where the at least one service include a location based service. An example apparatus optionally includes: means for determining validity of the resultant data using a validity function; and means for providing the decrypted resultant data for provision of at least one service by the service provider in response to a positive determination of validity.

BRIEF DESCRIPTION OF THE DRAWINGS

Figure 1:
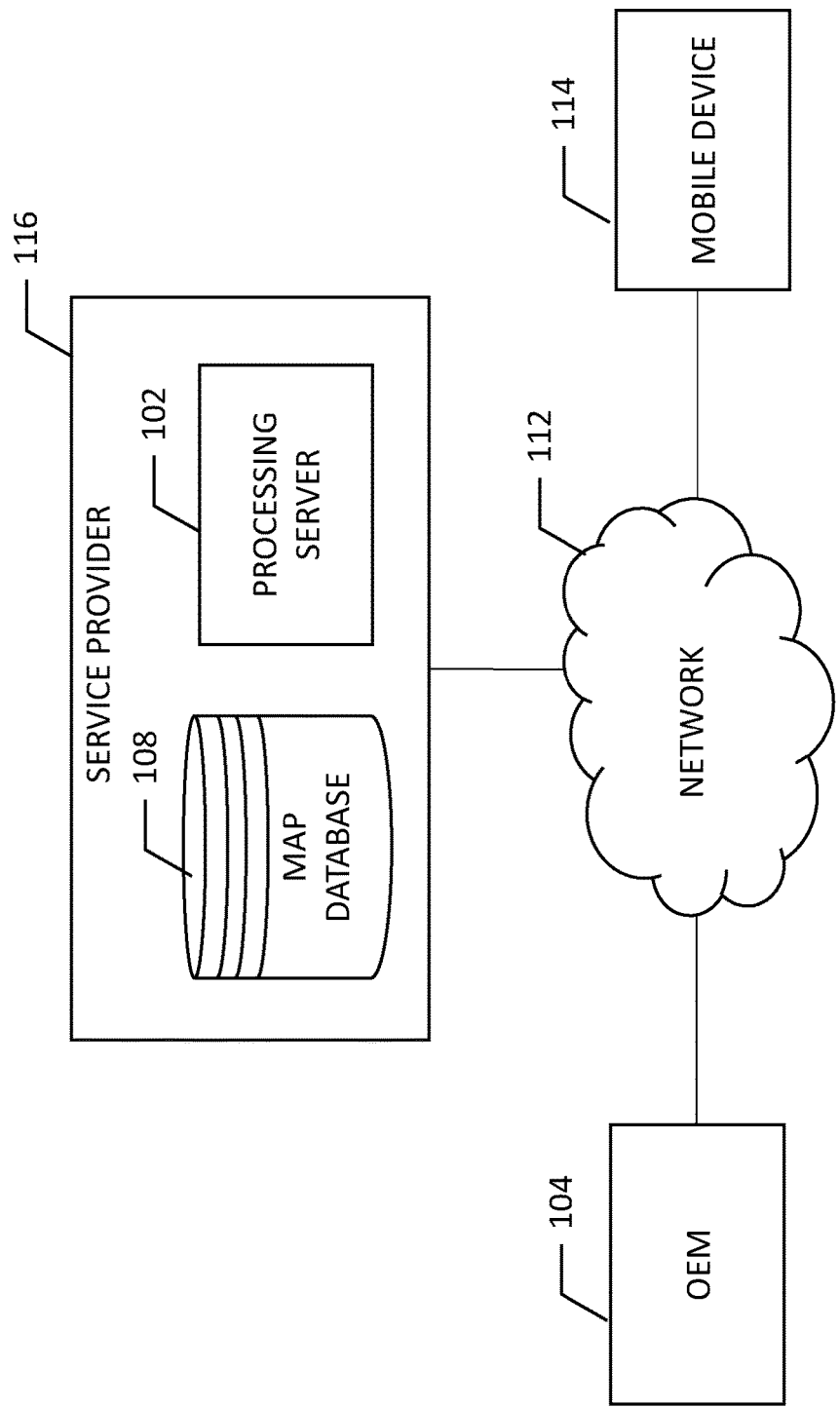
Figure 2:
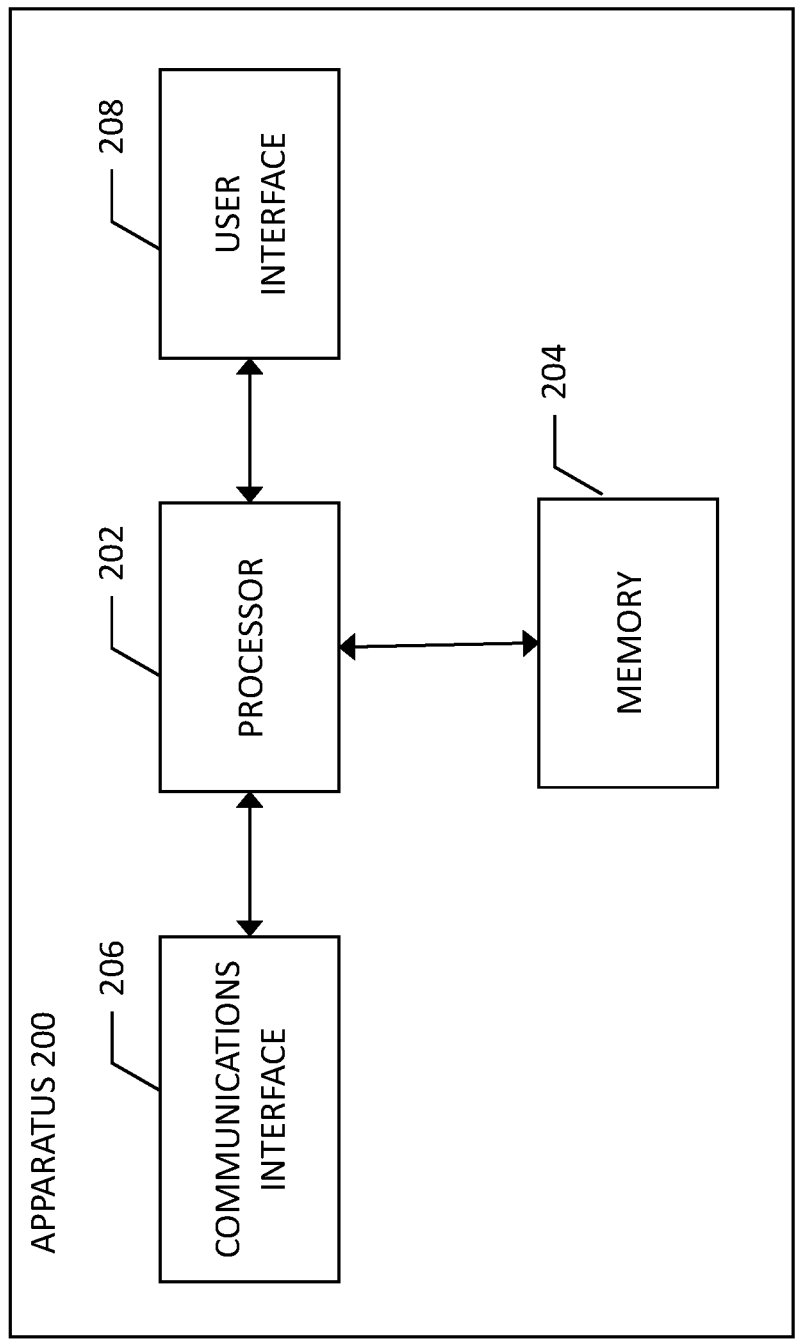
Figure 3:
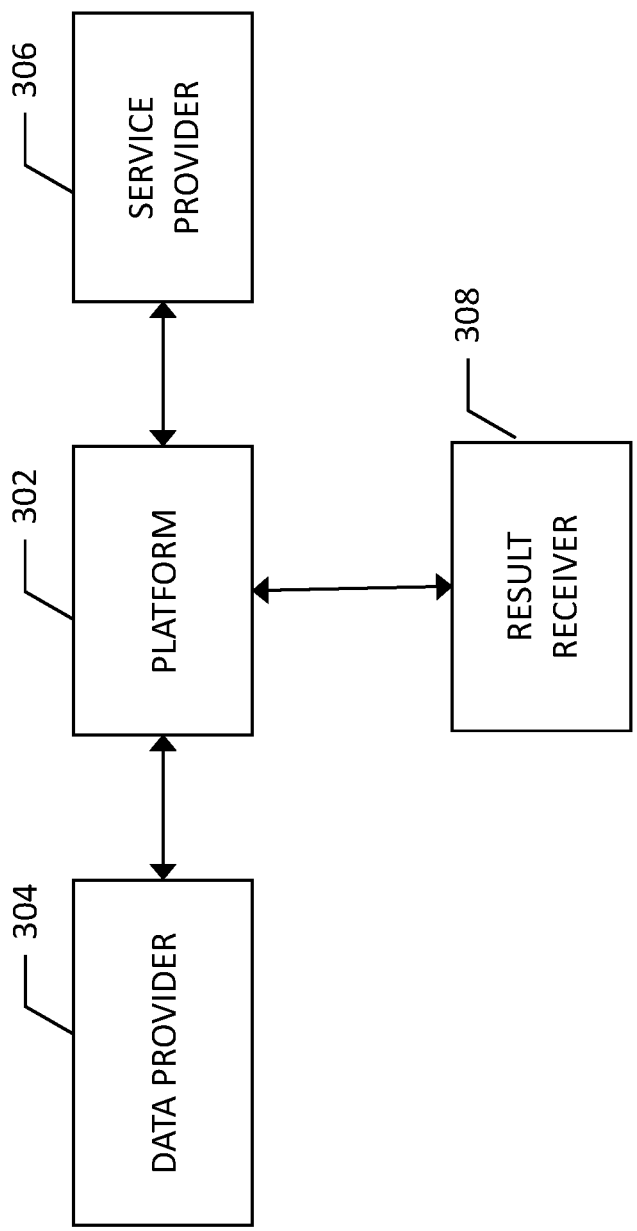
Figure 4:
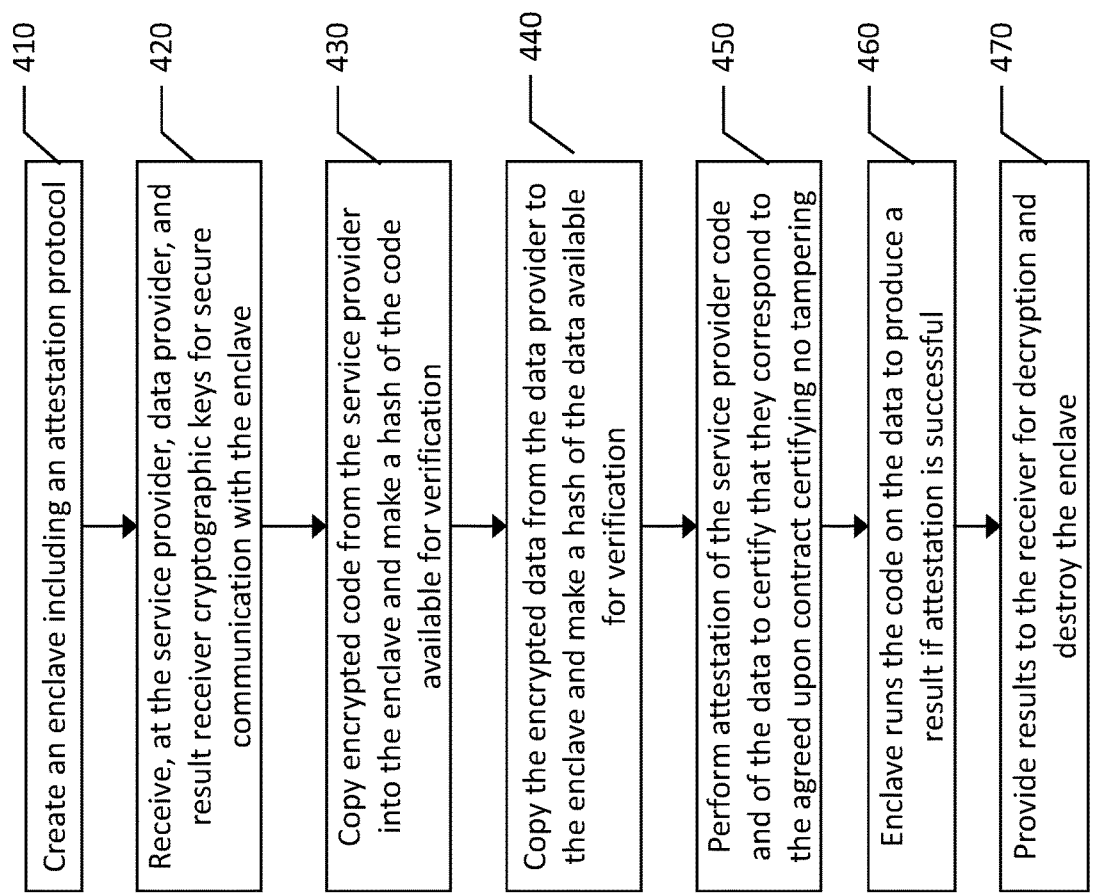
Figure 5:
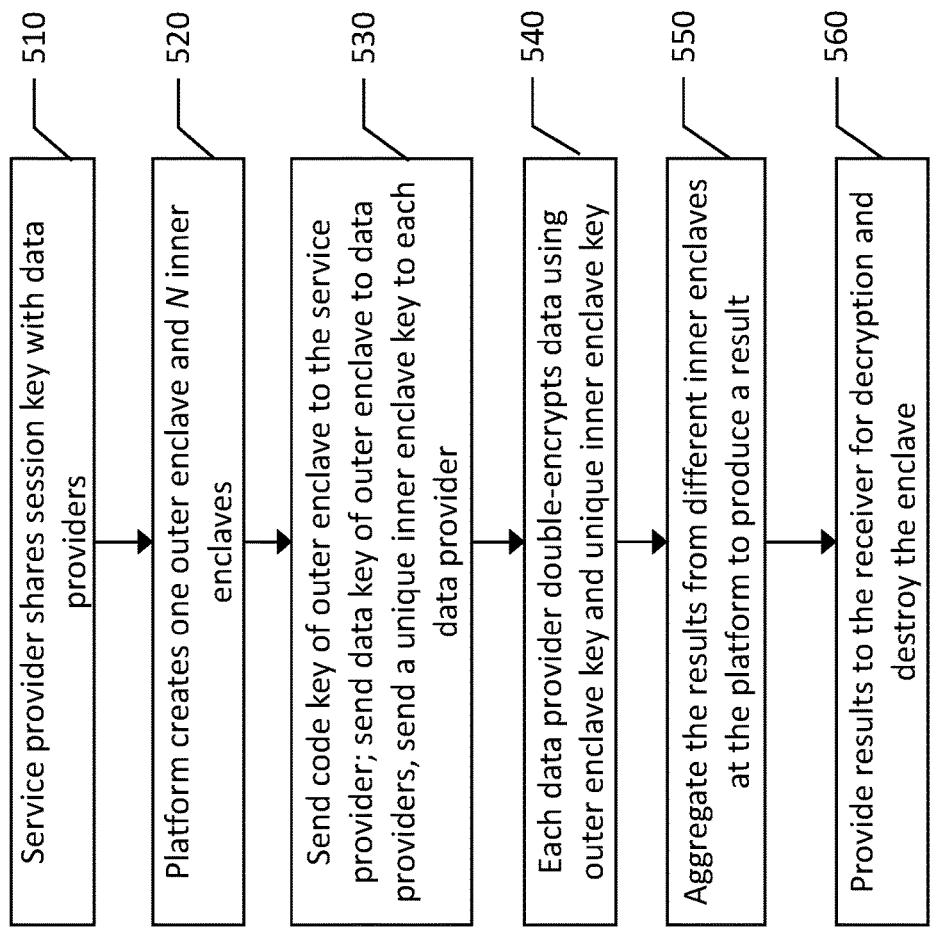
Figure 6:
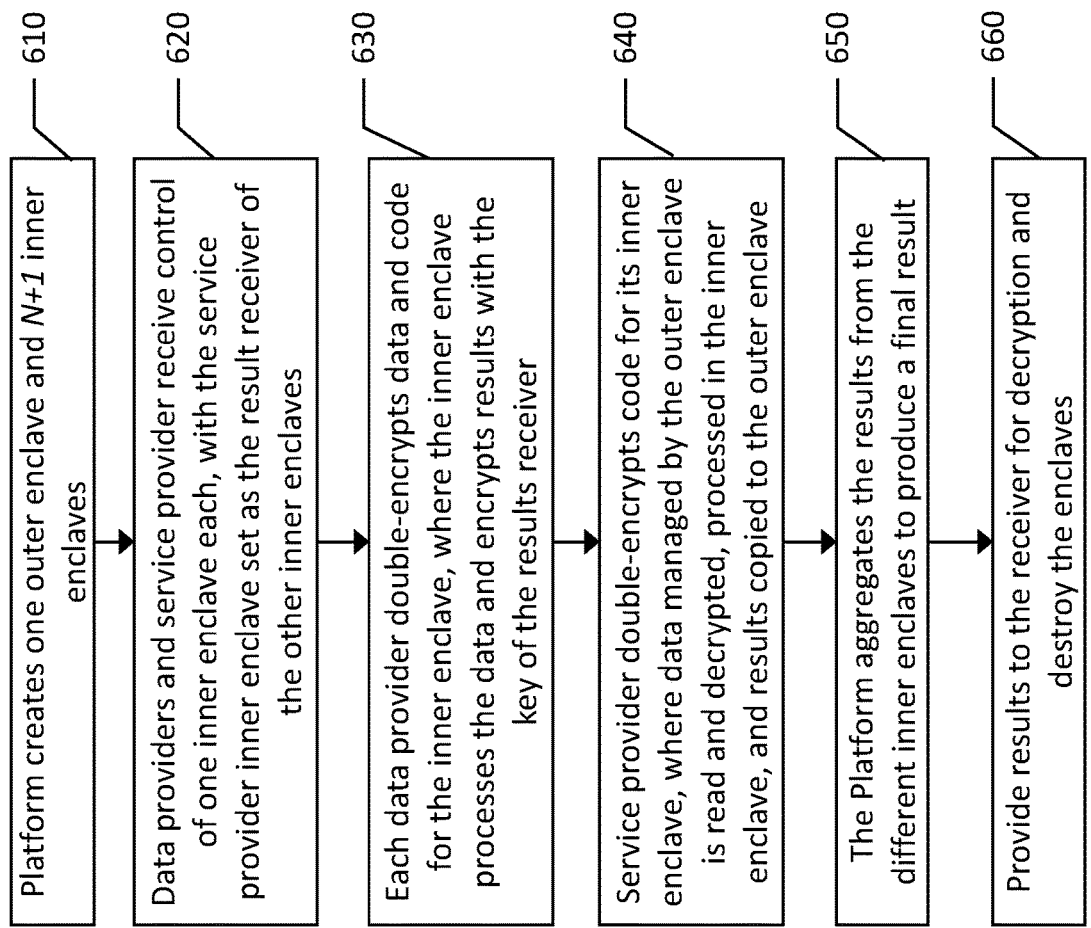
Figure 7:
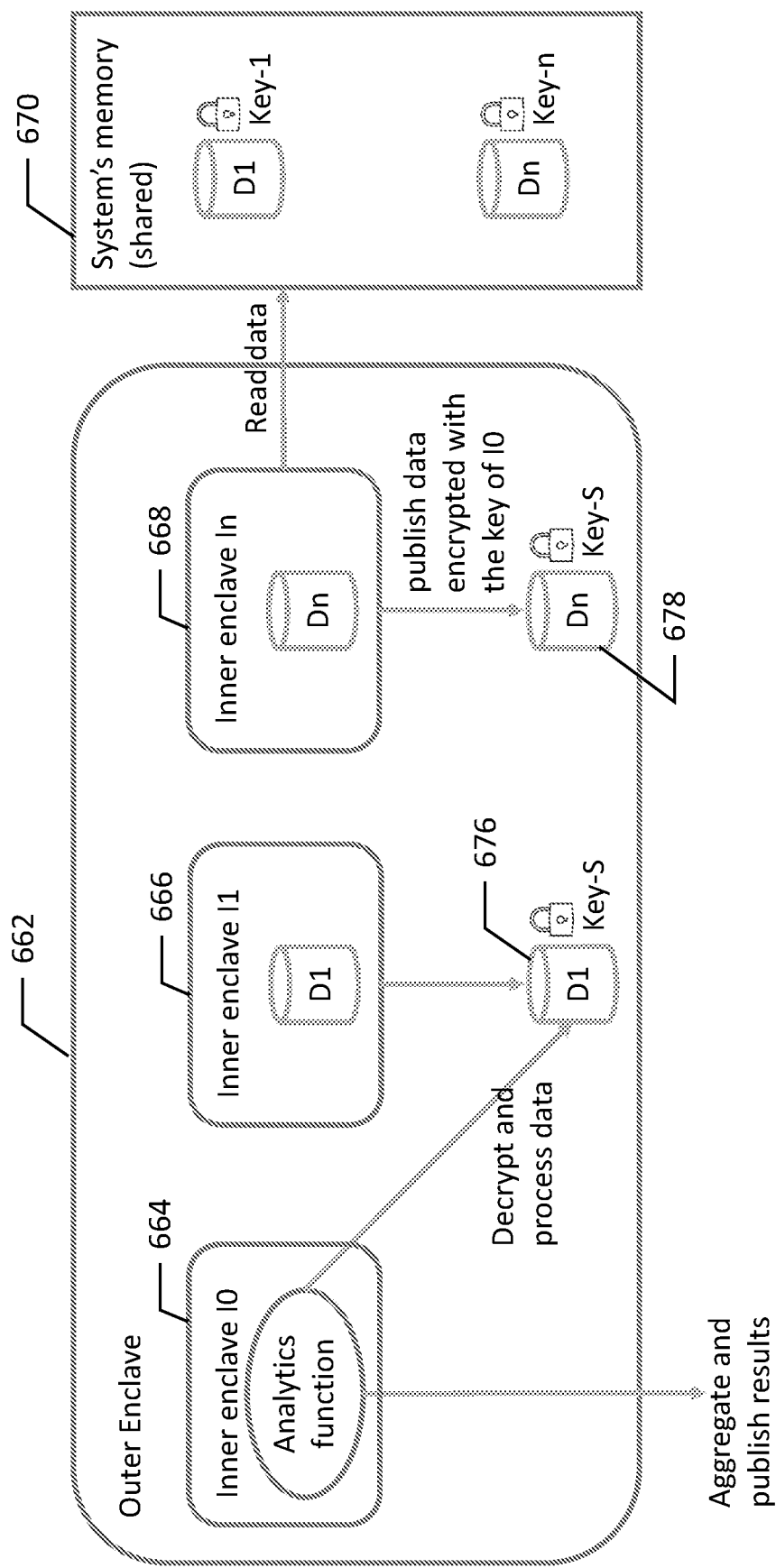

Having thus described example embodiments of the disclosure in general terms, reference will now be made to the accompanying drawings, which are not necessarily drawn to scale, and wherein:

FIG. 1 illustrates a communications diagram in accordance with an example embodiment of the present disclosure;

FIG. 2 is a block diagram of an apparatus that may be specifically configured for confidential computing in accordance with an example embodiment of the present invention;

FIG. 3 illustrates the entities involved in the confidential computing system according to example embodiment of the present disclosure;

FIG. 4 illustrates a flowchart of operations employed in the use of enclaves for confidential computing according to an example embodiment of the present disclosure;

FIG. 5 illustrates a flowchart of a method for confidential computing using nested enclaves according to an example embodiment of the present disclosure;

FIG. 6 illustrates a flowchart of a method for confidential computing using nested enclaves including a service provider according to an example embodiment of the present disclosure;

FIG. 7 illustrates a block diagram example of the nested enclaves employed in embodiments of the flowchart of FIG. 6.

Figure 8:
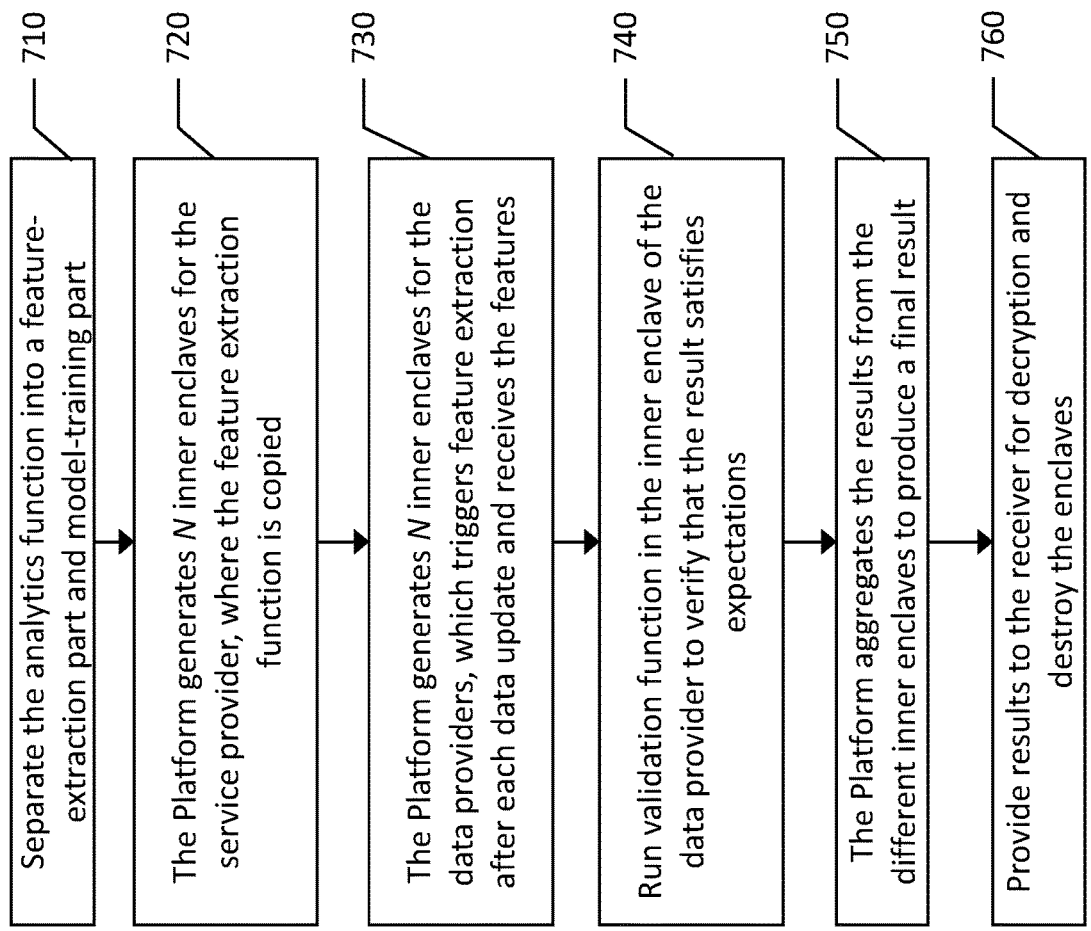
Figure 9:
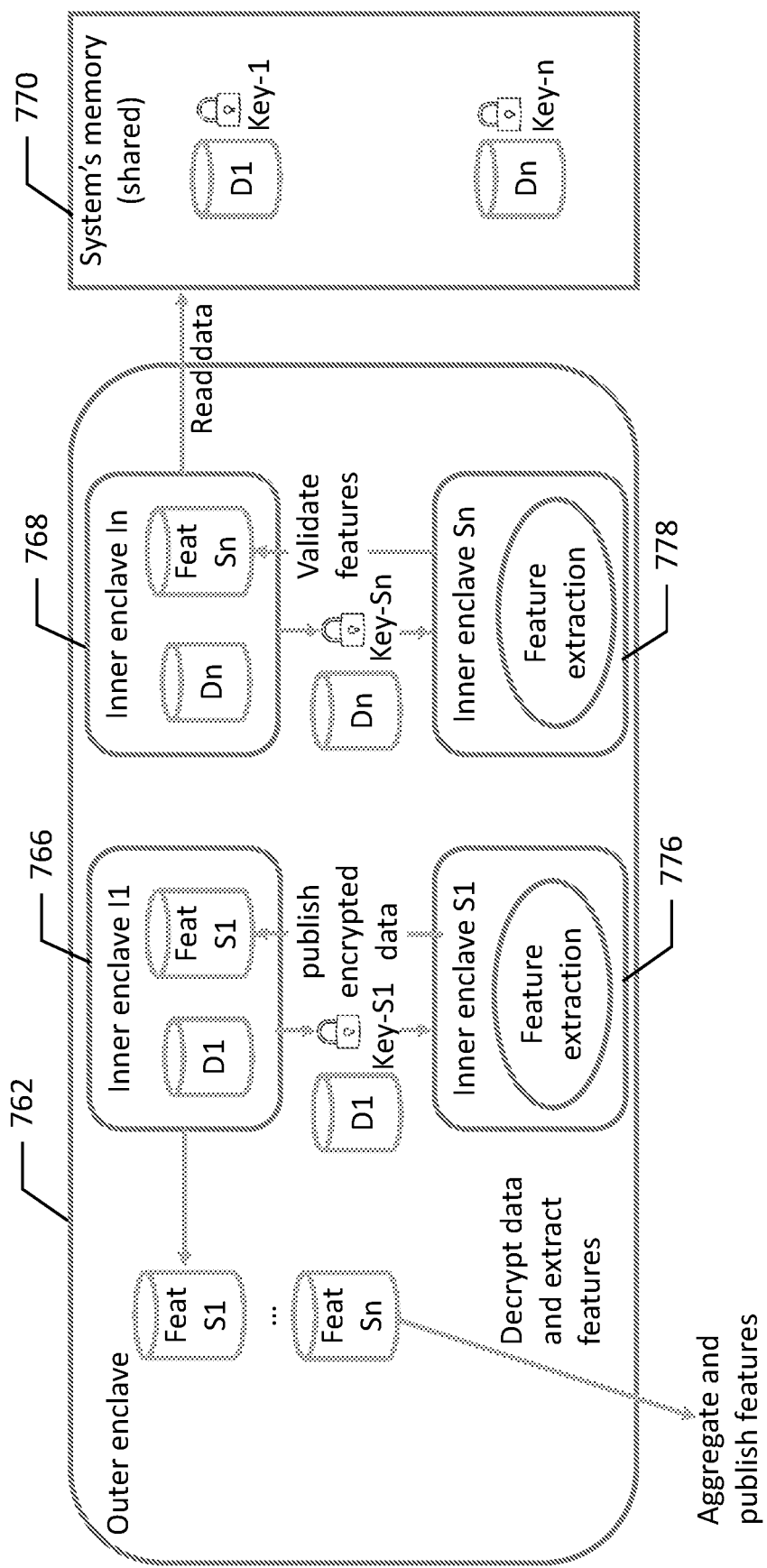

FIG. 8 illustrates a flowchart of a method for confidential computing using nested enclaves with feature extraction according to an example embodiment of the present disclosure;

FIG. 9 illustrates a block diagram example of the nested enclaves employed in embodiments of the flowchart of FIG. 8.

Figure 10:
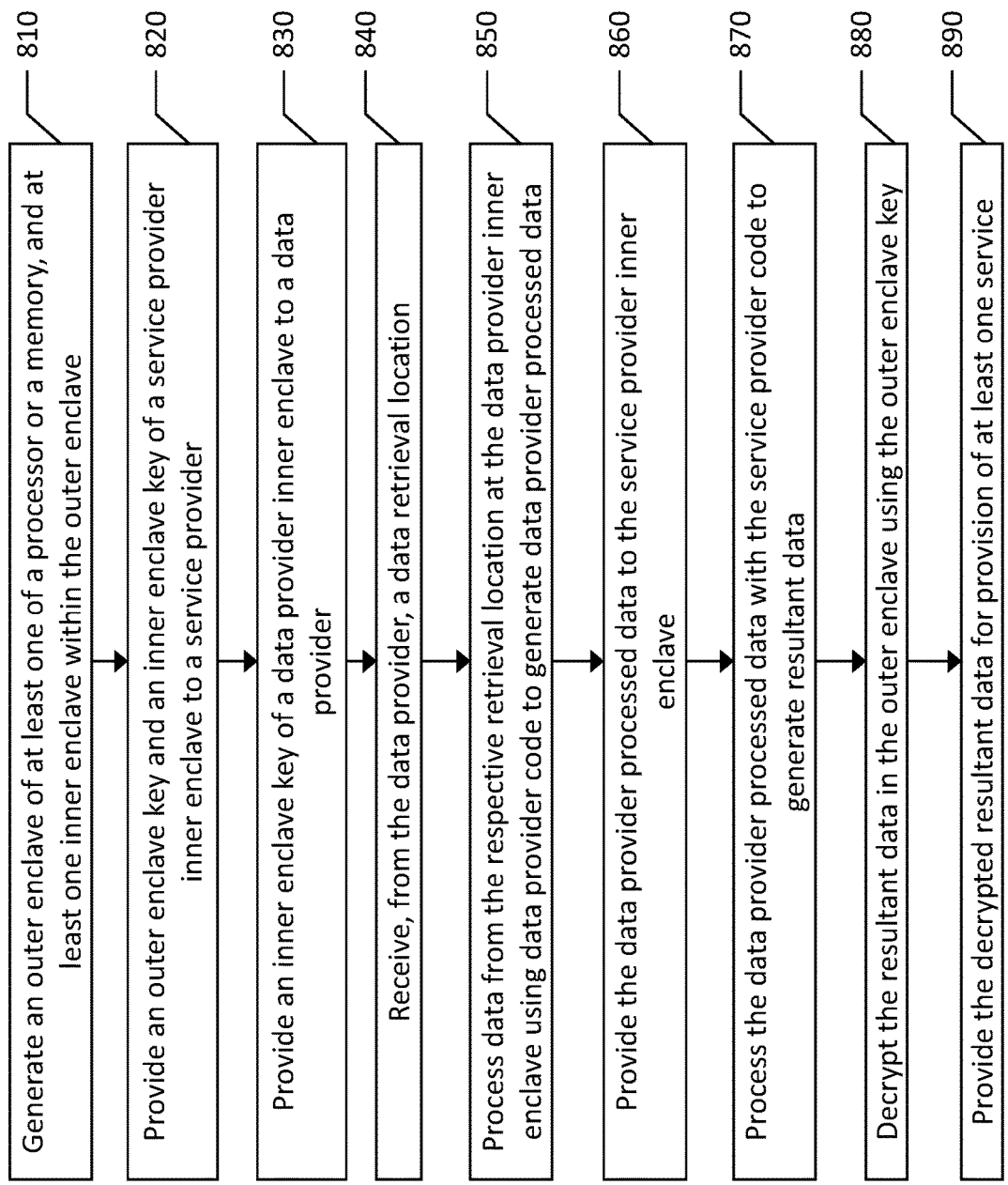
Figure 11:
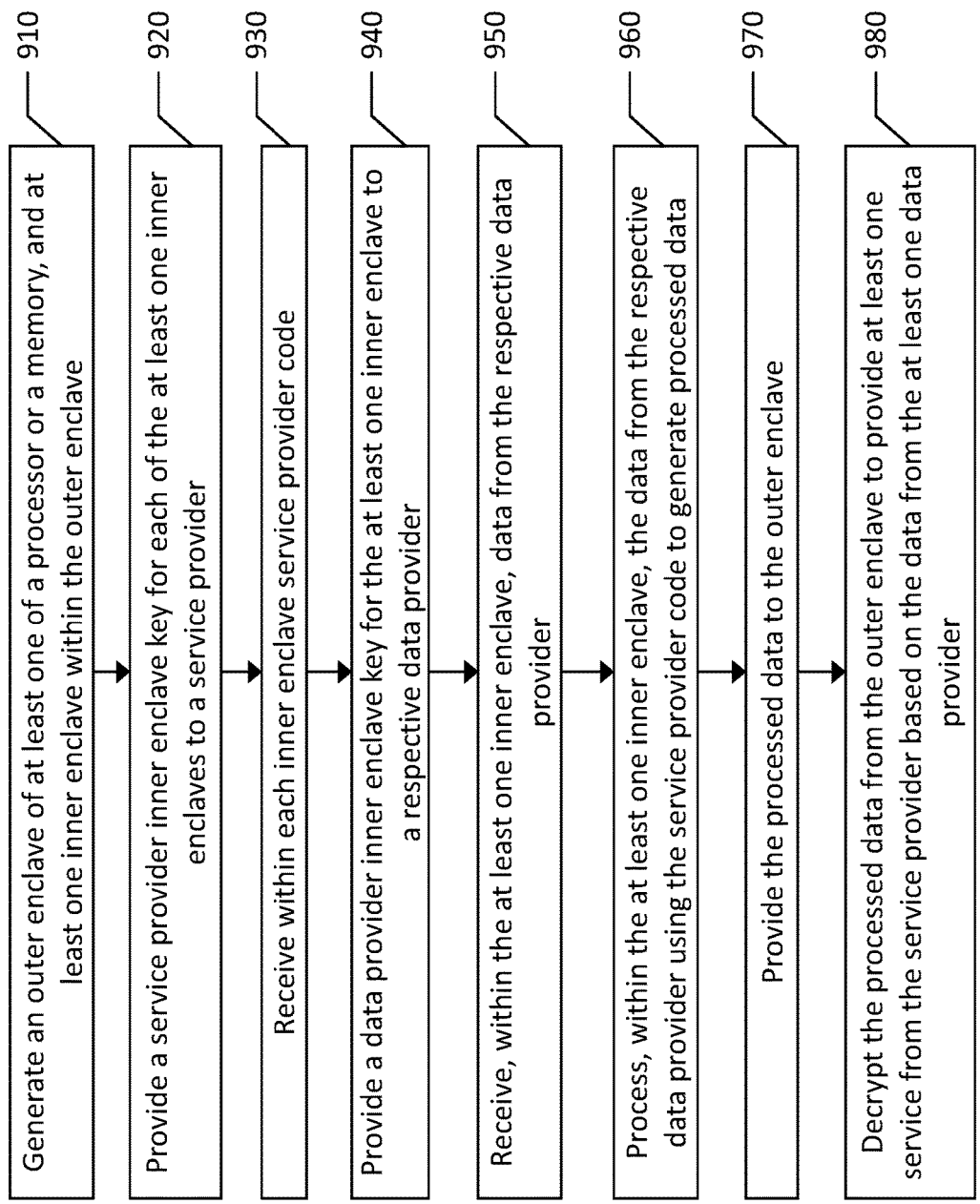

FIG. 10 illustrates another flowchart of a method for confidential computing using nested enclaves including a service provider according to an example embodiment of the present disclosure; and FIG. 11 illustrates still another flowchart of a method for confidential computing using nested enclaves including a service provider according to an example embodiment of the present disclosure.

DETAILED DESCRIPTION

Some embodiments of the present disclosure will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present disclosure.

Location-based services are services provided to a user based on location information, typically associated with the user. For example, location-based services may include real-time traffic information, fleet management, navigation, point-of-interest information, route guidance, etc. These location-based services are based on mobility data that users of such services provide. However, the quality and accuracy of location-based services often employs a balance between data privacy of the user and providing sufficient data to a service provider that accurate, high-quality location-based services can be provided. Further, location-based services may require access to large amounts of historical mobility data that may come from different providers. For privacy and regulatory reasons, these providers may be reluctant to disclose their data unless there are assurances that no sensitive information is disclosed.

Obtaining large amounts of data for the creation of location-based services is complex as it involves producing contracts with multiple providers and developing an infrastructure and facilitating matching data providers with location-based service providers. When providing location-based services, data from one or more providers is analyzed with code by a different provider. Standard encryption techniques allow secure data transfer (e.g., TLS (Transport Layer Security)) and storage (e.g., disk encryption). However, when data is in use (e.g., being processed by a location-based service provider), data security is much more difficult and costly in terms of data utility (e.g., anonymization or computational resources), such as with homomorphic encryption.

Embodiments described herein provide an apparatus, method, and computer program product that provides data security while the data is in use while ensuring limited computational overhead, limited coding effort to adapt systems, and a high quality of data for use with location-based services in particular. Embodiments enable data platforms to fulfill contracts to run code provided by a service provider on data from one or more data providers with the ability to prove that the contract was executed correctly and with certainty that the code cannot perform any malicious analysis on the data, such as through re-identification.

Location-based services may be provided based on mobility data from one or more users as data providers. Mobility data may be defined as a set of points or probe data points, each of which includes at least a latitude, longitude, and timestamp. Additional information may be associated with the probe data points, such as speed, heading, or other data. A trajectory includes a set of probe data points, where probe data points of a trajectory may include a trajectory identifier that associates the probe data points with one another. Mobility data captured in trajectories can be partitioned in a set of trajectories (trajectory data), each of which identifies the movement of a user over time. Anonymization of trajectories while providing sufficient information for location based services to be effective requires a balance to be struck between valuable trajectory information including location information of probe data points while also introducing ambiguity for anonymization. This balance can be difficult to achieve, such that confidential computing of mobility data may provide an improved mechanism by which location-based services can be provided with improved accuracy.

Anonymization in many cases must be performed in real-time or almost-real-time (e.g., anonymized data must be released with a short delay). Anonymization of location and trajectory data may be performed through application of privacy-enhancing algorithms on the data. Performing this anonymization in real-time or near-real-time is difficult as there are more constraints on what changes can be performed on the data and there is no information available regarding future trajectory data.

Mobility data and trajectories for a vehicle and/or mobile device can facilitate the use of location-based services for a variety of functions. However, mobility data and trajectories themselves may provide substantial information regarding an origin, destination, and path taken by a user associated with a vehicle or mobile device raising privacy concerns. Location-based services rely on accurate location information to provide the most accurate and relevant service. Location-based services are useful to a variety of consumers who may employ location-based services for a wide range of activities. Services such as the identification of traffic location and density, providing information regarding goods and services available in a specific location, and identifying a target group of consumers in a particular location or who travel along a particular path, are among many other location-based services.

While location-based services are desirable for both consumers and for service providers, consumers are often concerned with the amount of information shared about their routines and activities. Thus, while consumers and service providers want to engage with location-based services, consumers generally desire to maintain some degree of privacy. Anonymization of mobility data degrades the accuracy and efficacy of location-based services. Consequently, it is desirable to use non-anonymized mobility data to provide location-based services. Embodiments provided herein provide confidential computing to process datasets (e.g., datasets of probe data points) that maintain the analysis and the data as private while being able to confirm that the data was appropriately processed by the code of a service provider. This enables the provision of optimal location-based services while maintaining data privacy of the source of the mobility data.

To provide an improved manner of processing mobility data, a system as illustrated in FIG. 1 may be used. FIG. 1 illustrates a communication diagram of an example embodiment of a system for implementing example embodiments described herein. The illustrated embodiment of FIG. 1 includes a service provider 116 having a map database 108 and processing server 102 in data communication with an original equipment manufacturer (OEM) 104 and one or more mobile devices 114 through a network 112. The OEM may be one form of a data provider from which mobility data is received. The mobile device 114 may be associated, coupled, or otherwise integrated with a vehicle, such as in a vehicle's head unit, infotainment unit, or an advanced driver assistance system (ADAS), for example. Additional, different, or fewer components may be provided. For example, many mobile devices 114 may connect with the network 112. The service provider 116 may include computer systems and network of a system operator. The processing server 102 may include or be in communication with the map database 108, such as a remote map server. The network may be wired, wireless, or any combination of wired and wireless communication networks, such as cellular, Wi-Fi, internet, local area networks, or the like.

The OEM 104 may include a server and a database configured to receive probe data from vehicles or devices corresponding to the OEM. For example, if the OEM is a brand of automobile, each of that manufacturer's automobiles (e.g., mobile device 114) may provide probe data to the OEM 104 for processing. That probe data may be encrypted with a proprietary encryption or encryption that is unique to the OEM. The OEM may be the manufacturer or service provider for a brand of vehicle or a device. For example, a mobile device carried by a user (e.g., driver or occupant) of a vehicle may be of a particular brand or service (e.g., mobile provider), where the OEM may correspond to the particular brand or service. As such, the OEM 104 illustrated in FIG. 1 is not limited to original equipment manufacturers, but may be any entity participating as described herein with respect to the OEMs.

The OEM 104 may be configured to access the map database 108 via the processing server 102 through, for example, a mapping application, such that the user equipment may provide navigational assistance to a user among other services provided through access to the service provider 116. According to some embodiments, the service provider 116 may function as the OEM, such as when the OEM provides map services to vehicles from that OEM. In such an embodiment, the service provider 116 may or may not be the recipient of vehicle probe data from the vehicles of that manufacturer. Similarly, the service provider 116 may provide services to mobile devices, such as a map services provider that may be implemented on a mobile device, such as in a mapping application. According to such an embodiment, the service provider 116 may function as the OEM as the service provider receives the probe data from the mobile devices of users as they travel along a road network.

The map database 108 may include node data, road segment data or link data, point of interest (POI) data, or the like. The map database 108 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 108 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 108 can include data about the POIs and their respective locations in the POI records. The map database 108 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 108 can include event data (e.g., traffic incidents, construction activities, scheduled events, unscheduled events, etc.) associated with the POI data records or other records of the map database 108.

The map database 108 may be a master map database stored in a format that facilitates updating, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by mobile device 114, for example. The navigation-related functions can correspond to vehicle navigation, pedestrian navigation, or other types of navigation. While example embodiments described herein generally relate to vehicular travel, example embodiments may be implemented for bicycle travel along bike, watercraft travel along maritime navigational routes, etc. The compilation to produce the end user databases can be performed by a party or entity separate from the map developer. For example, a customer of the service provider, such as a navigation device developer or other end user device developer, can perform compilation on a received map database in a delivery format to produce one or more compiled navigation databases.

As mentioned above, the server side map database 108 may be a master geographic database, but in alternate embodiments, a client side map database 108 may represent a compiled navigation database that may be used in or with end user devices (e.g., mobile device 114) to provide navigation and/or map-related functions. For example, the map database 108 may be used with the mobile device 114 to provide an end user with navigation features. In such a case, the map database 108 can be downloaded or stored on the end user device (mobile device 114) which can access the map database 108 through a wireless or wired connection, such as via a processing server 102 and/or the network 112, for example.

In one embodiment, the mobile device 114 can be an in-vehicle navigation system, such as an ADAS, a personal navigation device (PND), a portable navigation device, a cellular telephone, a smart phone, a personal digital assistant (PDA), a watch, a camera, a computer, and/or other device that can perform navigation-related functions, such as digital routing and map display. An end user can use the mobile device 114 for navigation and map functions such as guidance and map display, for example, and for determination of one or more personalized routes or route segments based on one or more calculated and recorded routes, according to some example embodiments.

An ADAS may be used to improve the comfort, efficiency, safety, and overall satisfaction of driving. Examples of such advanced driver assistance systems include semi-autonomous driver assistance features such as adaptive headlight aiming, adaptive cruise control, lane departure warning and control, curve warning, speed limit notification, hazard warning, predictive cruise control, adaptive shift control, among others. Other examples of an ADAS may include provisions for fully autonomous control of a vehicle to drive the vehicle along a road network without requiring input from a driver. Some of these advanced driver assistance systems use a variety of sensor mechanisms in the vehicle to determine the current state of the vehicle and the current state of the roadway ahead of the vehicle. These sensor mechanisms may include radar, infrared, ultrasonic, and vision-oriented sensors such as image sensors and light distancing and ranging (LiDAR) sensors.

Some advanced driver assistance systems may employ digital map data. Such systems may be referred to as map-enhanced ADAS. The digital map data can be used in advanced driver assistance systems to provide information about the road network, road geometry, road conditions, and other information associated with the road and environment around the vehicle. Unlike some sensors, the digital map data is not affected by the environmental conditions such as fog, rain, or snow. Additionally, the digital map data can provide useful information that cannot reliably be provided by sensors, such as curvature, grade, bank, speed limits that are not indicated by signage, lane restrictions, and so on. Further, digital map data can provide a predictive capability well beyond the driver's vision to determine the road ahead of the vehicle, around corners, over hills, or beyond obstructions. Accordingly, the digital map data can be a useful and sometimes necessary addition for some advanced driving assistance systems. In the example embodiment of a fully-autonomous vehicle, the ADAS uses the digital map data to determine a path along the road network to drive, such that accurate representations of the road are necessary, such as accurate representations of intersections and turn maneuvers there through.

The processing server 102 may receive probe data, directly or indirectly, from a mobile device 114, such as when the service provider 116 is functioning as the OEM 104. Optionally, the service provider 116 may receive probe data indirectly from the mobile device 114, such as when the mobile device 114 provides probe data to the OEM 104, and the OEM provides certain elements of the probe data to the service provider 116. Conventionally, the OEM 104 may anonymize the probe data or otherwise process the probe data to maintain privacy of a user of the mobile device 114 before providing the data to the service provider 116. However, as described herein, confidential computing may preclude this need. The mobile device 114 may include one or more detectors or sensors as a positioning system built or embedded into or within the interior of the mobile device 114. Alternatively, the mobile device 114 uses communications signals for position determination. The mobile device 114 may receive location data from a positioning system, such as a global positioning system (GPS), cellular tower location methods, access point communication fingerprinting, or the like. The server 102, either directly or indirectly, may receive sensor data configured to describe a position of a mobile device, or a controller of the mobile device 114 may receive the sensor data from the positioning system of the mobile device 114. The mobile device 114 may also include a system for tracking mobile device movement, such as rotation, velocity, or acceleration. Movement information may also be determined using the positioning system. The mobile device 114 may use the detectors and sensors to provide data indicating a location of a vehicle. This vehicle data, also referred to herein as "probe data", may be collected by any device capable of determining the necessary information, and providing the necessary information to a remote entity. The mobile device 114 is one example of a device that can function as a probe to collect probe data of a vehicle.

More specifically, probe data (e.g., collected by mobile device 114) may be representative of the location of a vehicle at a respective point in time and may be collected while a vehicle is traveling along a route. According to the example embodiment described below with the probe data being from motorized vehicles traveling along roadways, the probe data may include, without limitation, location data, (e.g. a latitudinal, longitudinal position, and/or height, GPS coordinates, proximity readings associated with a radio frequency identification (RFID) tag, or the like), rate of travel, (e.g. speed), direction of travel, (e.g. heading, cardinal direction, or the like), device identifier, (e.g. vehicle identifier, user identifier, or the like), a time stamp associated with the data collection, or the like. The mobile device 114, may be any device capable of collecting the aforementioned probe data. Some examples of the mobile device 114 may include specialized vehicle mapping equipment, navigational systems, mobile devices, such as phones or personal data assistants, or the like.

An example embodiment of a processing server 102 and/or an OEM 104 may be embodied in an apparatus as illustrated in FIG. 2. The apparatus, such as that shown in FIG. 2, may be specifically configured in accordance with an example embodiment of the present disclosure for performing confidential computing, and more particularly, to running code on one or more datasets and keeping the analysis and data private while being able to confirm that the service of the service contract was executed correctly. The apparatus may include or otherwise be in communication with a processor 202, a memory device 204, a communication interface 206, and a user interface 208. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor 202). The memory device may be configured to store information, data, content, applications, instructions, or the like, for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory device 204 or otherwise accessible to the processor. Processors, as described herein for purposes of use with confidential computing are capable of functioning with a trusted execution environment (TEE). A trusted execution environment is a secure area of a processor that ensures code and data stored in that environment is protected with respect to confidentiality and integrity. The TEE provides one or more enclaves in which data may be stored and processed while ensuring the data and code within the enclaves is maintained as confidential. Thus, embodiments of the processor as described herein include hardware technologies that can be used to support TEE implementations. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor specific device (for example, a mobile terminal or a fixed computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 200 of an example embodiment may also include a communication interface 206 that may be any means such as a device or circuitry embodied in either hardware or a combination of hardware and software that is configured to receive and/or transmit data to/from a communications device in communication with the apparatus, such as to facilitate communications with one or more mobile devices 114 or the like. In this regard, the communication interface may include, for example, an antenna (or multiple antennae) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware and/or software for supporting communication via cable, digital subscriber line (DSL), universal serial bus (USB) or other mechanisms.

The apparatus 200 may also include a user interface 208 that may in turn be in communication with the processor 202 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processor may comprise user interface circuitry configured to control at least some functions of one or more user interface elements such as a display and, in some embodiments, a plurality of speakers, a ringer, one or more microphones and/or the like. The processor and/or user interface circuitry comprising the processor may be configured to control one or more functions of one or more user interface elements through computer program instructions (for example, software and/or firmware) stored on a memory accessible to the processor (for example, memory device 204, and/or the like).

The apparatus 200 of some embodiments may be integrated with or otherwise on-board the vehicle whereby the apparatus 200 may be equipped with or in communication with (e.g., via communications interface 206) one or more sensors, such as a Global Navigation Satellite System (GNSS) sensor (e.g., GPS, Galileo, GLONASS, etc.), accelerometer, image sensor, inertial measurement unit (IMU), gyroscope, magnetic field sensor, etc. Any of the sensors may be used to sense information regarding the location, movement, positioning, or orientation of the apparatus for use in identifying a location of the apparatus 200. In some embodiments, the apparatus 200 ma derive information regarding location, movement, position, or orientation of the apparatus 200 based on communication signals perceived by the communications interface 206 such as through signal triangulation or signal fingerprinting, for example. In some embodiments, the apparatus may combine both sensor information and communication signals to drive a location of the apparatus 200.

Location-based services (LBS) such as real-time traffic information, fleet management, and navigation among others, are based on the analysis of mobility data that users of such services provide. Mobility data is associated with a privacy level and accuracy value. An accuracy value is based on the intrinsic utility of data toward the generation of location-based services. The privacy value reflects the sensitive information that mobility data reveals about a user's habits, behaviors, and personal information such as their home and/or work address.

Location-based service providers endeavor to collect as much location data as possible to maximize the accuracy of the location-based services, while attempting to minimize the associated risks for the privacy of the users particularly as it relates to the inadvertent disclosure or misuse of data. To reduce the privacy risk, location-based service providers may apply privacy-enhancing algorithms on data. Privacy-enhancing algorithms function by removing or altering features of the data that may remove privacy, and this operation typically renders the data less accurate and thus less valuable for the location-based service provider.

Embodiments described herein employs confidential computing to receive and process a dataset of probe data points using location-based service code while being able to maintain the privacy of the dataset and the location-based service code and confirming that the processing was performed as it is contracted to do.

There exist several technologies for the private analysis and processing of data. Anonymization techniques remove all private information from data before it is analyzed; however, this reduces the utility of the data and reduces the quality of the results of processing the anonymized data. Homomorphic encryption (HE) allows for the analysis and processing of encrypted data, such that a third party is unable to decrypt the data and gain any insights from it. The advantage of such confidential computing is that the utility and quality of results of the analysis and processing are not adversely affected, but there is a cost in terms of computational overhead and in coding effort as it is necessary to re-implement the analysis code to take advantage of the technology.

Confidential computing enables the execution of code in an encrypted area of a machine, which prevents anyone besides the owner of the data/code from obtaining any insight about the data/code. Confidential computing works by verifying via cryptographic properties that the code which is going to be executed is the agreed-upon or contracted code and has not been tampered with. The code then runs in an encrypted area of the central processing unit (e.g., processing server 102) and may load confidential data in an encrypted area of memory such that nobody, even with physical access to the machine, can infer anything about the data and the processing. Confidential computing allows high quality data analysis with a lower computational overhead with respect to Homomorphic Encryption. Further, confidential computing does not require rewriting of the code extensively.

Confidential computing presumes that the client owns both data and code. However, this is not necessarily the case. According to example embodiments, the data provider or the provider of datasets of probe data points, should not obtain the analysis code generated by the location-based service provider, as such code may be proprietary and include business secrets. Similarly, the location-based service provider should not have access to the data from the data provider as it may contain sensitive, private information. Finally, the platform on which the processing is performed should not be in the condition to add malicious code to the analysis which may be intended to exfiltrate sensitive information.

An advantage of running analytics on a platform that implements confidential computing is two-fold: the attack surface that could host malicious code is reduced to just the analysis function of the service provider, as the platform infrastructure does not need to be trusted; and residual risks can be addressed contractually between the data provider and the service provider. Further, the platform offers the service of matching demand (analytics) with offer (data), which cannot be offered in a scenario where the service provider offers the infrastructure. The service provider, in some embodiments, serves as the platform itself. Matching of demand with the offer is performed with a platform, and the platform may be the service provider when two entities deal directly with one another. Solutions based on confidential computing allow computing a trusted program on multiple datasets, breaking the assumption that a single entity owns both the data and the code. These solutions assume the data to be known in advance of the computation to be known in advance, which is not always realistic in a platform context, where new data might be available on a continuous basis.

Embodiments described herein employ confidential computing including nested enclaves, where one confidential computing environment (enclave) is run inside another enclave, such that the inner enclave has access to the resources of the outer enclave, but not vice-versa. This enables additional security to be employed to satisfy greater confidentiality requirements. Embodiments adapt confidential computing to a scenario in which a platform wants to run code on one or more datasets, keep analysis and data secret, and be able to verify that the data was analyzed as agreed to (e.g., via contract or agreement).

According to an example embodiment, a service is provided that computes traffic based on trajectory data (datasets) from multiple providers. For example, a service provider 116 wants to offer traffic estimates on a service marketplace platform trained using data from multiple OEMs 104 as data providers. Data providers may not trust one another or the platform, and need to ensure nothing about their data (e.g., mobility data) is leaked for privacy reasons. The service provider 116 does not want to reveal their analytical processes as they may contain confidential information (e.g., model parameters). The data provider needs to trust the service provider not to execute any form of malicious analysis, which can be enforced via a contract or agreement. Both data provider and service provider want to ensure that the analysis was computed according to the contract, such that the correct analysis is performed on the correct data, to ensure the quality of the output and that the analysis has not been tampered with.

FIG. 3 illustrates the entities involved in the confidential computing system of example embodiments provided herein. Data providers 304 offer their data for the purpose of providing a service. The data provider 304 wants to benefit from the service (e.g., profit, subscribers, etc.) and they want to ensure that the data remains secret. Further, data providers want to ensure analysis of the provided data conforms to their expectations in providing a valuable service and maintains privacy. The data provider 304 may be a probe apparatus such as a mobile device that provides mobility data in the form of trajectories and probe data points reflecting movement of the device which may correlate with the movement of a user. A service provider 306 offers their analytics code for the purpose of providing a service from the data of the data provider 304. The service provider 306 wants to maintain their code in secret as it may contain confidential information. The service provider 306 may be, for example, a location-based service provider that uses mobility data from the data provider 304 to provide location-based services. The service provider 306 may process mobility data from a plurality of data providers to provide services such as dynamic traffic information. A platform 302 offers the confidential computing infrastructure as described herein that executes the computation of the service provider code on the data from the data provider. The platform 302 produces an attestation report that ensures the agreed-upon code was run on the data, and nothing else which might be malicious (e.g., exfiltrate sensitive information) was performed. The platform infrastructure performs check-summing of service provider code and data to ensure they match with what the service provider 306 and data providers 304 intend to be part of the computation, and that the other parties have explicitly approved. A result receiver 308 obtains the results of the computations.

The four roles (data provider 304, service provider 306, platform 302, and result receiver 308) can be taken by any combination of actors. The result receiver 308 may include the platform 302 for the purpose of sharing the results with other location-based service providers 306. The service provider 306 and the platform 302 provider may be the same entity. The service provider 306 may act as a data provider 304 such as when the service provider is a map services provider.

Generally, confidential computing solutions are not viable for location-based services as the size of a dataset is generally too large for the limited secure memory of an enclave such that execution may require repeated steps on multiple subsets of data. The data may not be available at the start of the computation when the data is streaming in near real-time. Embodiments described herein do not require the provision of a dataset before the start of the computation and maintain security assurances about the source and the correctness of data.

Confidential computing enclaves enable a client to provide code and data on which to run code, with the certainty that no third party can infer anything about the dataset or the code, while having certainty that only the specified, non-tampered code can be run on the specified dataset. The code powering the confidential computing infrastructure of example embodiments is trusted by all parties, such as Open Source, to perform correctly the protocol and computation. A confidential computing system is based on the concept of an enclave of a secure and protected environment where the computation is run. FIG. 4 illustrates an example embodiment of operations employed in the use of enclaves for confidential computing. Enclaves are created by a server, such as one managed by the platform and an attestation protocol that certifies that the enclave is trustworthy, as shown in operation 410. The service provider, the data providers, and the result receivers each receive cryptographic keys that they will use to securely communicate with the enclave as shown at operation 420. The service provider copies the encrypted code in the enclave and makes the hash of the code available for verification of the processing results as shown at operation 430. The data provider copies the encrypted data in the enclave and makes the hash of the data available for verification as shown at operation 440. The platform provider code, at operation 450, performs attestation of the service provider code and of the data to certify that they correspond to what was agreed to by the parties, certifying that the computation has not been tampered with. If the attestation is successful, the enclave runs the code on the data and produces the results as shown at operation 460. The result receiver obtains the results and decrypts them using the key before the enclave is destroyed as shown at operation 470.

Conventionally, confidential computing using an enclave is limited by use on only a specific dataset before the enclave is destroyed, adding overhead particularly when training machine learning models iteratively as the model would have to be returned after processing and a new enclave created any time new data is available. Further, datasets that do not fit in the enclave's protected memory cannot be processed in multiple steps on different subsets. Embodiments provided herein support additional scenarios in which near real-time data can be used by modifying the protocol such that the data provider does not provide the data during enclave creation. Instead of data, the following three elements are provided. The first is the beginning of a region of memory that is under control of the data provider, such as a pointer to a region of shared memory or the name of a data catalog/database. The second is the size of the memory region, which can indicate the extent of the memory under control of the data provider (e.g., to avoid overflows) or the size of a standard batch of data in the streaming/near real-time scenario. Although providing a proper real-time service is in principle possible, the confidential computing protocol is likely to add too much overhead, such that it is assumed that the scenario is at most 'near real-time' with new batches of data periodically, such as every one minute. The third element is additional information required to access the data, such as credentials and/or a signature of the data to prove authenticity. This process involves the function of the system itself including the platform (e.g., apparatus 200) by increasing the capability of the confidential computing using enclaves.

Using the aforementioned elements, the elements do not change during the processing of the data while the data can change in the location specified by these elements. Therefore, the data provider can validate that the data is read from the agreed location by providing the hash of these elements to the attestation protocol. This further removes the requirement to provide the hash of the data, which may not be yet known at the time of creation of the enclave. Further, an indication of the size of the data to be retrieved may also be provided. The content of the elements and the data stored in this memory can be encrypted with the enclave key such that it will not be visible to any third party. Thus, all information and data could be stored in a region of shared memory on the server. In the case of batch data provided to a location from which data is retrieved, the location remains constant but the hash changes. In such an embodiment, the hash can be located at a known position in memory such that the hash can change while the pointer to the location of the batch data remains constant.

The data provider 304 or platform 302 may further be required to provide code that manages the data. At least some logic can be implemented to understand the contents of the elements provided and read the data, such as accessing and reading data from a region of memory defined by a pointer versus data catalog with access credentials. Additional logic can be implemented to ensure that the memory limit is not crossed.

Some data analysis requires processing data in an iterative fashion, such as a machine learning model that may be trained on successive iterations on different data, or analysis of data within a sliding window. Additional logic can be employed to deal with updates in the data, such as a next batch of a large dataset or of a streaming dataset that is available on a memory to be read and processed. A polling algorithm may be used that periodically checks for new data or a notification/interrupt mechanism that listens for messages from the data provider to the enclave advertising availability of new data. This logic may optionally implement an algorithm that triggers an update to the model and/or results as soon as the new data is available. Optionally, model updates could be a separate action that the service provider or the result receiver could trigger asynchronously. To enable this scenario, a dataset may be kept in the enclave's protected memory, in which data from different providers is aggregated and pre-processed (e.g., compressed). This aggregated dataset may be updated anytime new data is available and may be deleted after each model update.

While the aforementioned processing technique is for the data provider to exchange data or provide access to data in near real-time with the platform, embodiments may use similar logic to allow the result receiver to query for partial results. This type of result receiving is particularly useful in a streaming/sliding window context, where computation continues for a long period of time and intermediate results are valuable. One example is traffic estimation, where the estimates at any point during execution of the service are valuable.

The additional logic used by example embodiments described herein can add security risks related to malicious data providers, particularly in the setting where computation is executed on data from more than one provider, and therefore a malicious data provider could exfiltrate sensitive information about another provider. One possible avenue for misuse is to upload malicious code for processing the data which reads data from other providers and writes it back to the shared memory. To prevent these risks, embodiments seek to isolate the data of each provider. Data can be isolated by encrypting it with a session key generated by the service provider; however, this would only provide confidentiality at rest and exfiltration could be performed while the data is processed by the data provider's code on the enclave's shared memory. As such, embodiments isolate each provider inside a nested enclave. Nested enclaves have visibility to enclaves that contain them, and contain the analysis code by the service provider, but not to other enclaves.

FIG. 5 illustrates a flowchart of an example embodiment of this solution. As shown at operation 510, the service provider shares a session key with the data providers. The platform creates one outer enclave and N inner enclaves as shown at operation 520. The code key of the outer enclave is sent to the service provider and the data key of the outer enclave to each data provider, while each data provider receives a key to a respective inner enclave at operation 530. Each data provider double-encrypts data (that is the information about how to access the data from an external medium: pointer, size, and credentials) at operation 540. Encrypted data is read from the external medium and decrypted in the inner enclave's protected memory. Plain text data is visible to only code that runs inside the enclave, such that any malicious code from another party involved in the process cannot analyze the data and share insights with a third party. Other inner enclaves do not have visibility to one another. Optionally, data can be pre-processed through anonymization. The data is encrypted with the session key and copied for the outer enclave. At operation 550, the platform aggregates the results from different inner enclaves (from different data sets) to produce a final result. This operation can optionally be executed inside the outer enclave. The results are provided to the receiver for decryption and the outer enclave (and inner enclaves) are destroyed at operation 560.

The solution of the method illustrated in FIG. 4 using inner enclaves unique to each data provider offers confidentiality of the data but leaves the analysis algorithm vulnerable to malicious activities such as reverse engineering or exfiltration. Placing the algorithm (code) inside another nested enclave may not be viable since the algorithm would not have visibility of the data. FIG. 6 illustrates a method of example embodiments described herein including protection for both the data and the code. As shown, the platform creates one outer enclave and N+1 inner enclaves as illustrated at option 610. The data providers and the service provider receive control of one inner enclave each as shown at operation 620. The inner enclave controlled by the service provider is set as the result receiver for each of the other inner enclaves, such that only the service provider can access the unencrypted results. Each data provider double-encrypts data and code for the respective inner enclave where the data is processed and encrypted with the key of the results receiver, which is the inner enclave that belongs to the service provider, and a copy made for the outer enclave as shown at operation 630. The service provider double-encrypts the code for its inner enclave at operation 640, where the data managed by the outer enclave is read and decrypted, the data is processed, and the results copied for the outer enclave. The platform aggregates the results from the different inner enclaves (from different datasets) to produce a final result as shown at operation 650. This operation can be executed inside the outer enclave. The results are provided to the results receiver for decryption and the enclaves are destroyed at operation 660.

FIG. 7 illustrates a block diagram example of the nested enclaves employed in embodiments of the flowchart of FIG. 6. As shown, the outer enclave 662 includes an inner enclave 664 for the service provider and service provider code in the form of an analytics function, and inner enclave 666 and 668 representing inner enclaves 1 . . . N. As shown, each of inner enclaves 666 and 668 retrieve data from a retrieval location, which in the illustrated embodiment is shared memory 670 using unique keys (e.g., Key-1 . . . Key-n), respectively. The data is processed and published encrypted with the key (Key-S) of the service provider inner enclave 664 as data 676 and data 678. This enables the service provider to analyze the data in the service provider inner enclave 664. The service provider then aggregates and publishes the results in the form of a location based service.

The aforementioned confidential computing methods provide a unique method to provide privacy-secured encrypted processing of datasets, even when processing those datasets in near real-time. Embodiments may further resolve an issues of trusting the service provider to not be malicious, as the service provider has access to the data and could exfiltrate some sensitive information, particularly if the platform is also the result receiver. Embodiments can mitigate this risk by requiring or request that data providers inspect the results and look for potentially sensitive information leaks. Inspection may face hurdles as models are typically black-box models with no information provided as to how data is processed by the model, and service providers do not generally want to convert their models to white-box models for fear of disclosing confidential information. An example embodiment of resolving the service provider trust issue is detailed in the method of the flowchart of FIG. 8.

As illustrated in FIG. 8, the service provider separates the analytics function into a feature-extraction part and a model-training part as shown at 710. Only the feature-extraction part is executed in the enclave and the model training can happen in a separate process after features are returned by the enclave. The platform generates N inner enclaves for the service provider, where the feature extraction function is copied as shown at 720. These enclaves are set to process the data from a specific data provider and set that provider as the result receiver. The platform generates N inner enclaves for the data providers, which triggers feature extraction after each data update and receives the features as shown at 730. A validation function can be run in the inner enclave of the data provider to verify that the result matches the expectations as shown at 740 (e.g., contains only histograms where the minimum count is larger than k). The features are copied in the outer enclave and aggregated by the platform as shown at 750. The aggregated features are given to the service provider for model training, potentially inside a separate enclave for that specific purpose. The results are also provided to the receiver for decryption and the enclaves are destroyed at 760.

FIG. 9 illustrates a block diagram example of the nested enclaves employed in embodiments of the flowchart of FIG. 7. As shown, and as with the example of FIG. 7, data is read into an inner enclave from a shared location based on a key (e.g., one of keys Key-1 to Key-n) shared between the respective data provider inner enclave (e.g., inner enclaves 766 and 768) and the respective data retrieval location, which in the illustrated embodiment is in a shared memory 770. In this embodiment, the service provider separates the analytics function from the feature-extraction and model training parts. Only the feature-extraction portion is executed in the enclave. The platform generates N inner enclaves for service providers (e.g., inner enclaves 776 and 778). These service provider inner enclaves are set to process data from respective data provider inner enclaves and to set the respective data provider inner enclave as the result receiver. The data read by the data provider inner enclaves is shared using a key with a respective service provider enclave, where the service provider inner enclave performs feature extraction by processing the data from the data provider inner enclave. The service provider processed data is published to the respective data provider inner enclave and published to the outer enclave as service provider processed data. A validation function may be run in the inner enclave of a data provider to verify that the result matches expectations, where publication of the data only occurs if the validation is correct. In practice, the validation determines if a data provider's data is copied to the outer enclave or not, and only data in the outer enclave is then published. The service provider processed data is decrypted based on the outer enclave key and aggregated by the platform for publishing.

Inner enclaves that perform feature extractions can be managed and run code by the service provider such that a malicious service provider could attempt to exfiltrate sensitive information over the internet via the enclave calls. To prevent exfiltration of sensitive data, the outer enclave could cut off any communication with the inner enclaves right after the feature extraction function is uploaded, as no further action or communication by the service provider is required in the process.

Trajectory data as described herein is defined as a set of data points, each data point including a location and a timestamp. The location may be in the form of latitude and longitude, and potentially altitude. Additional information may be associated with a data point, such as speed, heading, etc. If a trajectory identifier is associated with each point, the trajectory data can be partitioned into a set of trajectories, each of which identifies the movement of a user over a period of time.

Location-based service providers may provide trajectory data to customers, such as municipalities interested in traffic optimization, data producers (e.g., drivers who share their trajectory data with the service provider), or the like. Any trajectory that reveals a user's behavioral patterns (e.g., going from A to B) can potentially reveal privacy-sensitive information and locations. Embodiments described herein mitigate this issue by maintaining the trajectory data as private, and processing the data using confidential computing as described above. In this manner, the private trajectory data is never read or shared such that privacy of a user is maintained.

FIGS. 4, 5, 6, 8, 10 and 11 illustrate a flowcharts depicting methods according to an example embodiments of the present disclosure. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 204 of an apparatus employing an embodiment of the present invention and executed by a processor 202 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

FIG. 10 illustrates a method of confidential computing to ensure private data remains private. In the illustrated embodiment, an outer enclave of at least one of a processor or a memory and at least one inner enclave within the outer enclave are generated at 810. At 820, a service provider is provided with an inner enclave key of a service provider inner enclave. An inner enclave key of a data provider inner enclave is provided to a data provider at 830. The data provider provides a data retrieval location in 840 in lieu of providing a set of data such that near-real time data can be processed from a location external of the platform. At 850, data is processed from the respective retrieval location at the data provider inner enclave using data provider code to generate data provider processed data. Data provider processed data is provided to the service provider inner enclave at 860. The data provider processed data is processed at 870 using the service provider code to generate resultant data. The resultant data is decrypted at 880 to the outer enclave using the outer enclave key. The decrypted resultant data is provided for provision of at least one service from the service provider at 890.

FIG. 11 illustrates another method of confidential computing to ensure private data remains private and code for data analysis and processing also remains confidential. According to the illustrated embodiment, an outer enclave of at least one of a processor or a memory is generated with at least one inner enclave therein as shown at 910. A service provider inner enclave key is provided to a service provider for each of the at least one inner enclaves at 920. Each inner enclave receives therein service provider code at 930. A data provider inner enclave key for the at least one inner enclave is provided to a respective data provider at 940. Within the at least one inner enclave, data is received from the respective data provider at 950. The data from the respective data provider is processed at 960 within the at least one inner enclave using the service provider code to generate processed data. The processed data is provided at 970 to the outer enclave. At 980, the processed data is decrypted from the outer enclave to provide at least one service from the service provider based on the data from the at least one data provider.

In an example embodiment, an apparatus for performing the methods of FIGS. 10 and/or 11 above may comprise a processor (e.g., the processor 202) configured to perform some or each of the operations (410-470, 510-560, 610-660, 710-760, 810-890 and/or 910-980) described above. The processor may, for example, be configured to perform the operations (410-470, 510-560, 610-660, 710-760, 810-890 and/or 910-980) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 410-470, 510-560, 610-660, 710-760, 810-890 and/or 910-980 may comprise, for example, the processor 202 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising at least one processor and at least one memory including computer program code, the at least one memory and computer program code configured to, with the processor, cause the apparatus to at least:
   generate an outer enclave of at least one of the at least one processor and the at least one memory, and at least one inner enclave within the outer enclave;
   provide an outer enclave key of the outer enclave and an inner enclave key of a service provider inner enclave to a service provider;
   provide an inner enclave key of a data provider inner enclave to a data provider of at least one data provider;
   receive, from the data provider, a data retrieval location;
   process data from the respective retrieval location at the data provider inner enclave using data provider code to generate data provider processed data;
   provide the data provider processed data to the service provider inner enclave;
   process the data provider processed data with service provider code to generate resultant data;
   decrypt the resultant data in the outer enclave using the outer enclave key; and
   provide the decrypted resultant data for provision of at least one service by the service provider.

2. The apparatus of claim 1, wherein the received data retrieval location comprises at least one of a pointer to a region of shared memory or an identifier of a database.

3. The apparatus of claim 1, wherein causing the apparatus to receive, from the data provider, a data retrieval location further comprises causing the apparatus to receive, from the data provider, a batch size of data to be retrieved from the data retrieval location.

4. The apparatus of claim 1, wherein causing the apparatus to receive, from the data provider, a data retrieval location, further comprises causing the apparatus to receive, from the data provider, a hash of information provided with the data retrieval location, wherein the hash of information provided with the data retrieval location is used to validate that data is retrieved properly from the data retrieval location.

5. The apparatus of claim 1, wherein the data from the data provider comprises probe data including a series of location points and associated time stamps, wherein the service provider comprises a location-based service provider, and wherein the at least one service comprises a location-based service.

6. The apparatus of claim 1, wherein the apparatus is further caused to:
   determine validity of the resultant data using a validation function; and
   provide the decrypted resultant data for provision of at least one service by the service provider in response to a positive determination of validity.

7. The apparatus of claim 6, wherein the validity function comprises a hash function to confirm absence of malicious code in the service provider code and the data provider code.

8. A computer program product comprising at least one non-transitory computer-readable storage medium having computer-executable program code portions stored therein, the computer-executable program code portions comprising program code instructions configured to:
   generate an outer enclave of at least one of at least one processor and the at least one non-transitory memory, and at least one inner enclave within the outer enclave;
   provide a service provider inner enclave key for each of the at least one inner enclaves to a service provider;
   receive, within each inner enclave, service provider code;
   provide a data provider inner enclave key for the at least one inner enclave to a respective data provider;
   receive, within the at least one inner enclave, data from the respective data provider;
   process, within the at least one inner enclave, the data from the respective data provider using the service provider code to generate processed data;
   provide the processed data to the outer enclave; and decrypt the processed data from the outer enclave to provide at least one service from the service provider based on the data from the at least one data provider.

9. The computer program product of claim 8, wherein the received data retrieval location comprises at least one of a pointer to a region of shared memory or an identifier of a database.

10. The computer program product of claim 8, wherein the program code instructions to receive, from the data provider, a data retrieval location further comprise program code instructions to receive, from the data provider, a batch size of data to be retrieved from the data retrieval location.

11. The computer program product of claim 8, wherein the program code instructions to receive, from the data provider, a data retrieval location, further comprise program code instructions to receive, from the data provider, a hash of information provided with the data retrieval location, wherein the hash of information provided with the data retrieval location is used to validate that data is retrieved properly from the data retrieval location.

12. The computer program product of claim 8, wherein the data from the data provider comprises probe data including a series of location points and associated time stamps, wherein the service provider comprises a location-based service provider, and wherein the at least one service comprises a location-based service.

13. The computer program product of claim 8, further comprising program code instructions to:
    determine validity of the decrypted resultant data using a validation function; and
    provide the decrypted resultant data for provision of at least one service by the service provider in response to a positive determination of validity.

14. The computer program product of claim 13, wherein the validity function comprises a hash function to confirm absence of malicious code in the service provider code and the data provider code.

15. A method comprising:
    generating an outer enclave of at least one of at least one processor and at least one memory, and at least one inner enclave within the outer enclave;
    providing a service provider enclave key of a service provider enclave to a service provider, wherein the service provider enclave comprises at least one of the outer enclave and the at least one inner enclave;
    providing an inner enclave key of a data provider inner enclave to a data provider of at least one data provider;
    receiving, from the data provider, a data retrieval location;
    processing data from the respective retrieval location at the data provider inner enclave using data provider code to generate data provider processed data;
    providing the data provider processed data to the service provider enclave;
    processing the data provider processed data with service provider code in the service provider enclave to generate resultant data;
    decrypting the resultant data in the outer enclave using the outer enclave key; and
    providing the decrypted resultant data for provision of at least one service by the service provider.

16. The method of claim 15, wherein the received data retrieval location comprises at least one of a pointer to a region of shared memory or an identifier of a database.

17. The method of claim 15, wherein receiving, from the data provider, a data retrieval location further comprises receiving, from the data provider, a batch size of data to be retrieved from the data retrieval location.

18. The method of claim 15, wherein receiving, from the data provider, a data retrieval location, further comprises receiving, from the data provider, a hash of information provided with the data retrieval location, wherein the hash of information provided with the data retrieval location is used to validate that data is retrieved properly from the data retrieval location.

19. The method of claim 15, wherein the data from the data provider comprises probe data including a series of location points and associated time stamps, wherein the service provider comprises a location-based service provider, and wherein the at least one service comprises a location-based service.

20. The method of claim 15, further comprising:
    determining validity of the resultant data using a validation function; and
    providing the decrypted resultant data for provision of at least one service by the service provider in response to a positive determination of validity.

* * * * *